US007029648B2

(12) United States Patent
Subramanian et al.

(10) Patent No.: US 7,029,648 B2
(45) Date of Patent: Apr. 18, 2006

(54) PROCESS FOR MAKING DURABLE RUTILE TITANIUM DIOXIDE PIGMENT BY VAPOR PHASE DEPOSITION OF SURFACE TREATMENT

(75) Inventors: Narayanan Sankara Subramanian, Hockessin, DE (US); Russell Bertrum Diemer, Jr., Wilmington, DE (US); Pratibha Laxman Gai, Wilmington, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 10/887,115

(22) Filed: Jul. 8, 2004

(65) Prior Publication Data

US 2004/0258610 A1 Dec. 23, 2004

Related U.S. Application Data

(63) Continuation of application No. 10/211,669, filed on Aug. 2, 2002, now Pat. No. 6,852,306, which is a continuation of application No. 09/559,102, filed on Apr. 27, 2000, now abandoned.

(51) Int. Cl.
    *C01G 23/047* (2006.01)
(52) U.S. Cl. .................. 423/613; 423/612; 106/437; 106/442; 106/446
(58) Field of Classification Search ............... 423/613, 423/612; 106/437, 442, 446
    See application file for complete search history.

(56) References Cited

U.S. PATENT DOCUMENTS

| | | | |
|---|---|---|---|
| 2,488,439 A | 11/1949 | Heinrich et al. | |
| 2,559,638 A | 7/1951 | Krchma et al. | |
| 2,721,626 A | 10/1955 | Rick | |
| 3,219,468 A | 11/1965 | Evans et al. | |
| 3,364,048 A | 1/1968 | May | |
| 3,409,501 A | 11/1968 | Siuta | |
| 3,433,594 A | 3/1969 | Wilson et al. | |
| 3,512,219 A | 5/1970 | Stern et al. | |
| 3,767,455 A | 10/1973 | Claridge et al. | |
| 3,856,929 A | 12/1974 | Angerman et al. | |
| 3,928,057 A | 12/1975 | Decolibus | |
| 4,050,951 A | 9/1977 | Piccolo et al. | |
| 4,075,031 A | 2/1978 | Allen | |
| 4,214,913 A | 7/1980 | Glaeser | |
| 4,552,593 A | 11/1985 | Ostertag | |
| 4,927,464 A | 5/1990 | Cowie | |
| 5,562,764 A | 10/1996 | Gonzalez | |
| 5,599,519 A | 2/1997 | Haddow | |
| 5,728,205 A | 3/1998 | Allen et al. | |
| 5,730,795 A | 3/1998 | Herkimer | |
| 5,753,025 A | 5/1998 | Bettler et al. | |
| 5,922,120 A | 7/1999 | Subramanian et al. | |
| 6,682,705 B1 | 1/2004 | Gross et al. | |
| 6,852,306 B1 | 2/2005 | Subramanian et al. | |

FOREIGN PATENT DOCUMENTS

| | | |
|---|---|---|
| DE | DT1966970 A1 | 3/1969 |
| EP | 0 032 426 | 1/1981 |
| EP | 0430424 A | 6/1991 |
| GB | 689123 | 10/1950 |
| WO | WO/8911450 A | 11/1989 |
| WO | WO/96/00699 | 1/1996 |
| WO | WO/9606803 A1 | 3/1996 |
| WO | WO/9636441 | 11/1996 |
| WO | WO/98/53908 | 12/1998 |
| WO | WO/9932562 A | 7/1999 |
| WO | WO/00/20516 | 4/2000 |

OTHER PUBLICATIONS

Quint H. Powell, George P. Fotou, and Toivo T. Kodas, Synthesis of Alumina- and Alumina/Silica-Coated Titania Particles in an Aerosol Flow Reactor, Chem. Mater., 9, 685-693, 1997.
Sanjeev Jain, George P. Fotou and Tovio T. Kodas, A Theoretical Study on Gas-Phase Coating of Aerosol Particles, Journal of Colloid and Interface Science, 185, 26-38, 1997, Article CS964558.
William G. French, Laurel J. Pace and Victoria A. Foertmeyer, Chemical Kinetics of the Reactions of $SiCl_4$, $SiBr_4$, $GeCl_4$, $POCl_3$, and $BCl_3$ with Oxygen, The Journal of Physical Chemistry, 82, No. 20, 2191-2194, 1978.
Sotiris E. Pratsinis, Hebi Bai and Pratim Biswas, Kinetics of Titanium(IV) Chloride Oxidation, Jouranl of the American Ceramic Society, 73, No. 7, 2158-62, 1990.
Quint H. Powell, George P. Fotou and Toivo T. Kodas, Gas-Phase Coating of $TiO_2$ with $SiO_2$ in a Continuous Flow Hot-Wall Aerosol Reactor, J. Mater. Res., 12, No. 2, 552-559, Feb. 1997.
D.R. Powers, Kinetics of $SiCl_4$ Oxidation, J. Am. Ceram. Soc., 1978, vol. 61, No. 7-8, pp. 295-297.
M. Kamal Akhtar and Sotiris E. Pratsinis, Dopants in Vapor-Phase Synthesis of Titania Powders, Journal of the American Ceramic Society, 75, No. 12, 3408-3416, Dec. 1992.
Hawley's Condensed Chemical Dictionary, Eleventh Edition, N. Irving Sax and Richard J. Lewis Sr., p. 1159.

*Primary Examiner*—Steven Bos

(57) ABSTRACT

The present invention relates to a process for making durable titanium dioxide pigment by vapor phase deposition of surface treatments on the titanium dioxide particle surface by reacting titanium tetrachloride vapor, an oxygen containing gas and aluminum chloride in a plug flow reactor to form a product stream containing titanium dioxide particles; and introducing silicon tetrachloride into the reactor at a point down stream of the point where the titanium tetrachloride and oxygen were contacted and where at least 97% of the titanium tetrachloride has been converted to titanium dioxide or where the reaction temperature is no greater than about 1200° C., and preferably not more than about 1100° C.

30 Claims, 3 Drawing Sheets

P=pigment, C=coating

Figure 1A:
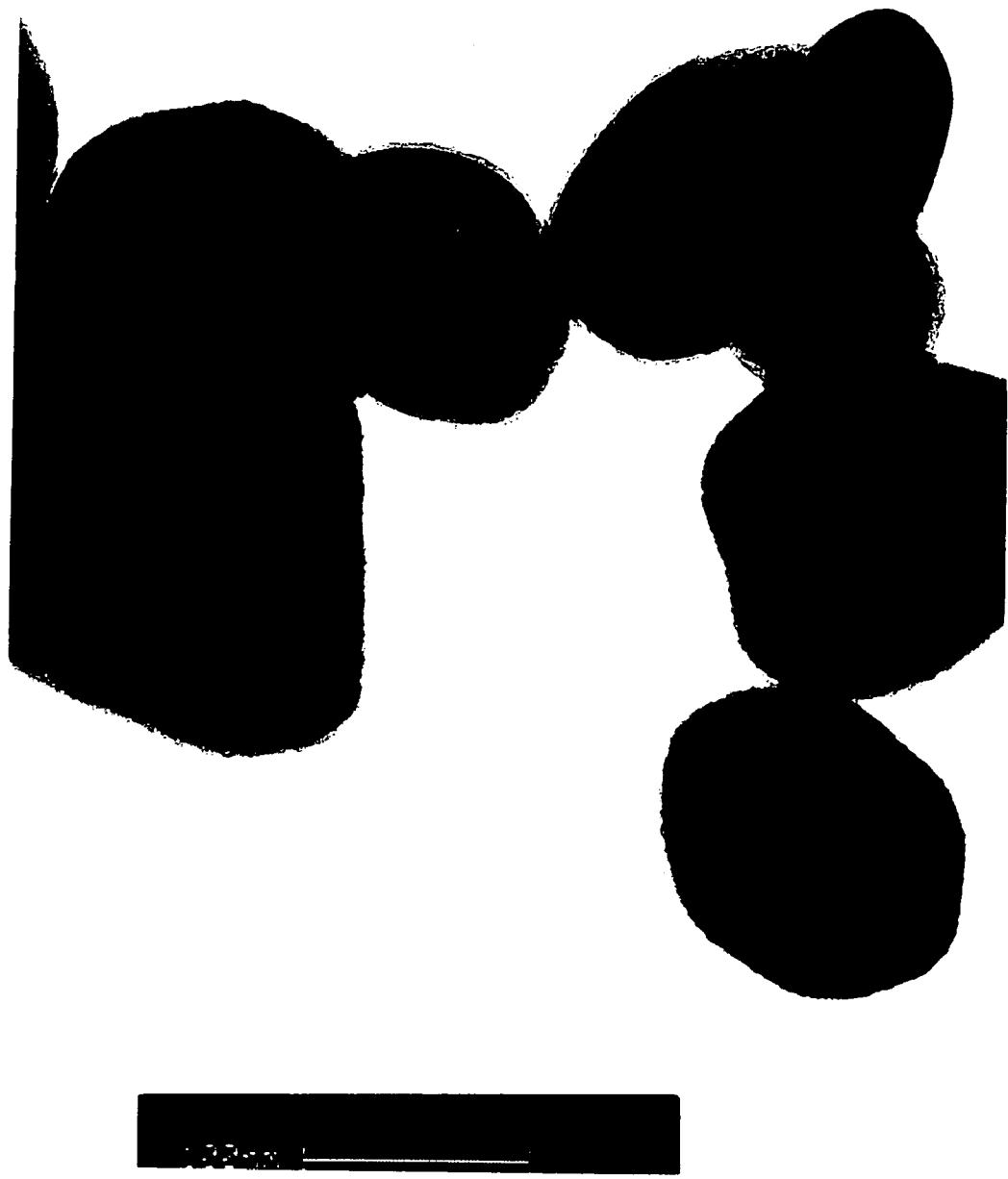

PROCESS FOR MAKING DURABLE RUTILE TITANIUM DIOXIDE PIGMENT BY VAPOR PHASE DEPOSITION OF SURFACE TREATMENT

CROSS REFERENCE TO RELATED APPLICATIONS

This application is a continuation of application Ser. No. 10/211,669, filed Aug. 2, 2002, now U.S. Pat. No. 6,852,306 which is a continuation of application Ser. No. 09/559,102, filed Apr. 27, 2000 which is now abandoned, which are all incorporated herein by reference in their entireties.

BACKGROUND OF THE INVENTION

The present invention relates to the chloride process for the production of titanium dioxide pigment. This invention provides a route to a durable grade pigment, without the necessity of depositing surface treatments on the titanium dioxide particles by wet treatment.

Typically titanium dioxide particles, produced by either the chloride or the sulfate process, are processed in one or more wet treatment operations to deposit metal oxides on the surface of the pigment in order to optimize the pigment properties of dispersion, optical spacing or durability. Deposits of aluminum oxide or comb-nations of aluminum oxide and silicon dioxide, used alone or in combination with other oxides, are typical constituents of commercial titanium dioxide pigment. Such surface treatments are deposited through precipitation of the desired metal oxide in a wet chemical reaction. Thus, the base pigment, that is, the titanium dioxide particles produced at the exit point of the oxidizer in the chloride process or after calcination in the sulfate process, must be washed and processed through one or more wet treatment steps. Wet treatment is then followed by washing, drying and grinding to produce a product suitable for use in for example, exterior coatings and plastics products.

Processes to influence the titanium dioxide crystal formation in the oxidizer of the chloride process were taught in British Patent 689,123, and U.S. Pat. Nos. 3,856,929; 4,124,913; and 5,562,764.

U.S. Pat. No. 3,856,929 teaches that by oxidizing a mixed stream containing titanium tetrachloride, a silicon halide and a phosphorus halide, the resulting titanium dioxide product was at least 80% by weight anatase.

U.S. Pat. No. 4,124,913 teaches a process producing rutile titanium dioxide particles at reduced levels of aluminum chloride concentration by oxidizing aluminum trichloride simultaneously with the titanium chloride followed by addition of phosphorous trichloride. The phosphorous trichloride is added at a point in the oxidizer where at least 80% of the titanium tetrachloride has been converted to titanium dioxide.

British Patent 689,123 teaches the oxidation of a mixture of titanium tetrachloride, aluminum trichloride and silicon tetrachloride where the ratio of aluminum oxide to silicon dioxide formed in the oxidation is from 3:1 to 1:1 and where the temperature is maintained in the range of 1000° C. to 1600° C. By this process it is claimed that 90% of the titanium dioxide formed is in the rutile crystal, and its particle size is about 0.5 microns or less.

U.S. Pat. No. 5,562,764 teaches a process for oxidizing a mixture of titanium tetrachloride and aluminum trichloride followed by the addition of silicon tetrachloride at a point down stream where the temperature at the addition point is in the range of 1200 to 1600° C. The inventor in this patent wanted to enhance pigment gloss and carbon black undertone (CBU) without producing a significant anatase component in the pigment product. Although the product according to this patent contained no more than 0.7 percent anatase, wet treatment was required to produce a durable and suitably dispersible pigment to meet industry standards.

U.S. Pat. No. 3,219,468 discloses the addition of silicon tetrachloride at a point removed from the addition point of the aluminum trichloride in a fluidized bed oxidation of titanium tetrachloride. The later addition of the silicon tetrachloride results in the production of a soft bed of titanium dioxide particles instead of a hard scale on the walls of the fluidized bed reactor.

So-called vapor or dry process to deposit surface treatments on the pigment in the oxidation step are taught in U.S. Pat. No. 4,050,951; PCT published patent application WO 96/36411; and European Patent 0 032 426. In U.S. Pat. Nos. 4,050,951 post treatment hydrolysis is taught. The disadvantage in this system is that the treatment step is a separate stage in the overall process following oxidization that requires the separation of base pigment from the oxidation product, then grinding followed by hydrolysis at temperatures lower than those temperatures present in the oxidizer.

PCT application WO 96/36441 teaches a vapor phase treatment process requiring that the silicon tetrachloride addition must be made at a temperature of more than 1300° C. This application further teaches that the addition of metal halides can be made in any sequence and at any point in the reactor.

European Patent 0 032 426 teaches a post treatment of titanium dioxide particles in a fluid bed reactor. This process requires an activation step where the titanium dioxide particles are contacted with metal chlorides followed by a hydrolysis to convert residual chlorides to oxides and oxide hydrates.

A common teaching in the art noted above is that the addition of silicon tetrachloride to the chlorination reaction is made at a temperature of at least 1200° C. and at a point relatively close to the point where the titanium tetrachloride was contacted by oxygen. The common belief at the time of the present invention was made was that at temperatures 1200° C. or less the rate of silicon tetrachloride conversion was so slow that pigment product would be contaminated by unreacted silicon tetrachloride as is taught in the article by D. R. Powers, "Kinetics of $SiCl_4$ Oxidation" published in *J. Am. Ceram. Soc*, vol. 61, No. 7–8, pp. 295–7 (1978). According to this understanding of reaction kinetics, even in the presence of excess oxygen, addition of silicon tetrachloride at temperatures of less than about 1300° C. would result in unreacted silicon tetrachloride in the product.

The present invention provides a process for the making of a durable grade pigment product in the oxidation unit of a chloride process titanium dioxide plant by adding silicon tetrachloride late in the reaction at a point where the reaction temperature is no greater than about 1200° C. and the base pigment is essentially formed. The inventors of the present process wanted to provide a process to make a durable grade commercial product of acceptable gloss and CBU but without the cost and additional processing required in the typical wet treatment operation.

BRIEF SUMMARY OF THE INVENTION

The present invention provides a process for making durable titanium dioxide pigment by vapor phase deposition of surface treatments on the titanium dioxide pigment particle surface, the process comprising the steps of:

(a) reacting titanium tetrachloride vapor and aluminum chloride and at least a stoichiometric amount of oxygen in a plug flow reactor to form a product stream containing titanium dioxide particles; and (b) introducing silicon tetrachloride into the reactor at one or more points downstream of the point where the titanium tetrachloride and oxygen were contacted and where at least 97% of the titanium tetrachloride has been converted to titanium dioxide.

Before the introduction of the silicon tetrachloride, it is more preferred that at least 98% of the titanium tetrachloride has been converted to titanium dioxide, and most preferred that at least 99% of the titanium tetrachloride has been converted.

It is also preferred that the silicon tetrachloride is introduced in an amount sufficient to provide a silicon dioxide content of a surface treated titanium dioxide pigment of about at least 1.2% by weight, and that the aluminum trichloride is added in an amount sufficient to provide an aluminum oxide content of a surface treated pigment of at least about 1% by weight.

Steam or oxygen may be introduced at a point downstream of the point addition of the silicon tetrachloride, or steam or oxygen may be introduced along with the silicon tetrachloride.

The present invention also provides a durable titanium dioxide pigment wherein at least 95% of the pigment particles are completely covered by a layer formed from a mixture of amorphous aluminum oxide and amorphous silicon dioxide, the pigment produced by:

(a) reacting titanium tetrachloride vapor and aluminum chloride and at least a stoichiometric amount of oxygen in a plug flow reactor to form a product stream containing titanium dioxide particles; and (b) introducing silicon tetrachloride into the reactor at one or more points downstream of the point where the titanium tetrachloride and oxygen were contacted and where at least 97% of the titanium tetrachloride has been converted to titanium dioxide.

The preferred composition of the pigment of the present invention is that the concentration of silicon dioxide is at least about 1.2% of the total weight of the pigment and the concentration of the aluminum oxide is at least about 1% of the total weight of the pigment.

The present invention provides durable titanium dioxide pigment particles having a surface treatment layer comprising aluminum oxide and silicon dioxide wherein at least 85% of the pigment particles are completely covered by a uniform layer formed from a mixture of amorphous aluminum oxide and amorphous silicon dioxide and wherein the pigment particles are free of debris.

The present invention also provides a method to determine a point of introduction of silicon tetrachloride into a plug flow reactor for the oxidation of a mixture of titanium tetrachloride and aluminum trichloride in a gas containing at least the stoichiometric amount of oxygen to produce titanium dioxide particle having a thin, uniform and complete layer of surface oxides comprising a mixture of amorphous aluminum oxide and silicon dioxide, the steps of the process comprising;

(a) determining the temperature in the reactor where not more than about 3% of the titanium tetrachloride remains unreacted using $$K = \frac{[2(100\% - u_{TiCl4}) + \phi \times 100\%]^2}{u_{TiCl4}(\beta + u_{TiCl4})}$$

and $$T < \frac{20733}{\ln K + 6.391} - 273.15$$

where
$u_{TiCl4}$=unreacted TiCl4 (%)
$\beta$=O2 (%) in excess of the stoichiometric amount
$\phi$=feed Cl2 mole ratio (mol/mol TiCl4), and
T=temperature (C);

and (b) introducing the silicon tetrachloride into the reactor where the temperature is equal to or less than the temperature calculated in step a.

In addition, the present invention includes a process for making durable titanium dioxide pigment by vapor phase deposition of surface treatments on the titanium dioxide pigment particle surface, the process comprising the steps of:

(a) reacting titanium tetrachloride vapor, an oxygen containing gas and aluminum chloride in a plug flow reactor to form a product stream containing titanium dioxide particles; and (b) introducing silicon tetrachloride into the reactor at one or more points downstream of the point where the titanium tetrachloride and oxygen were contacted and where the reaction temperature is no greater than about 1200° C. and more preferred no greater than 1100° C.

BRIEF DESCRIPTION OF THE DRAWING(S)

Figure 1B:
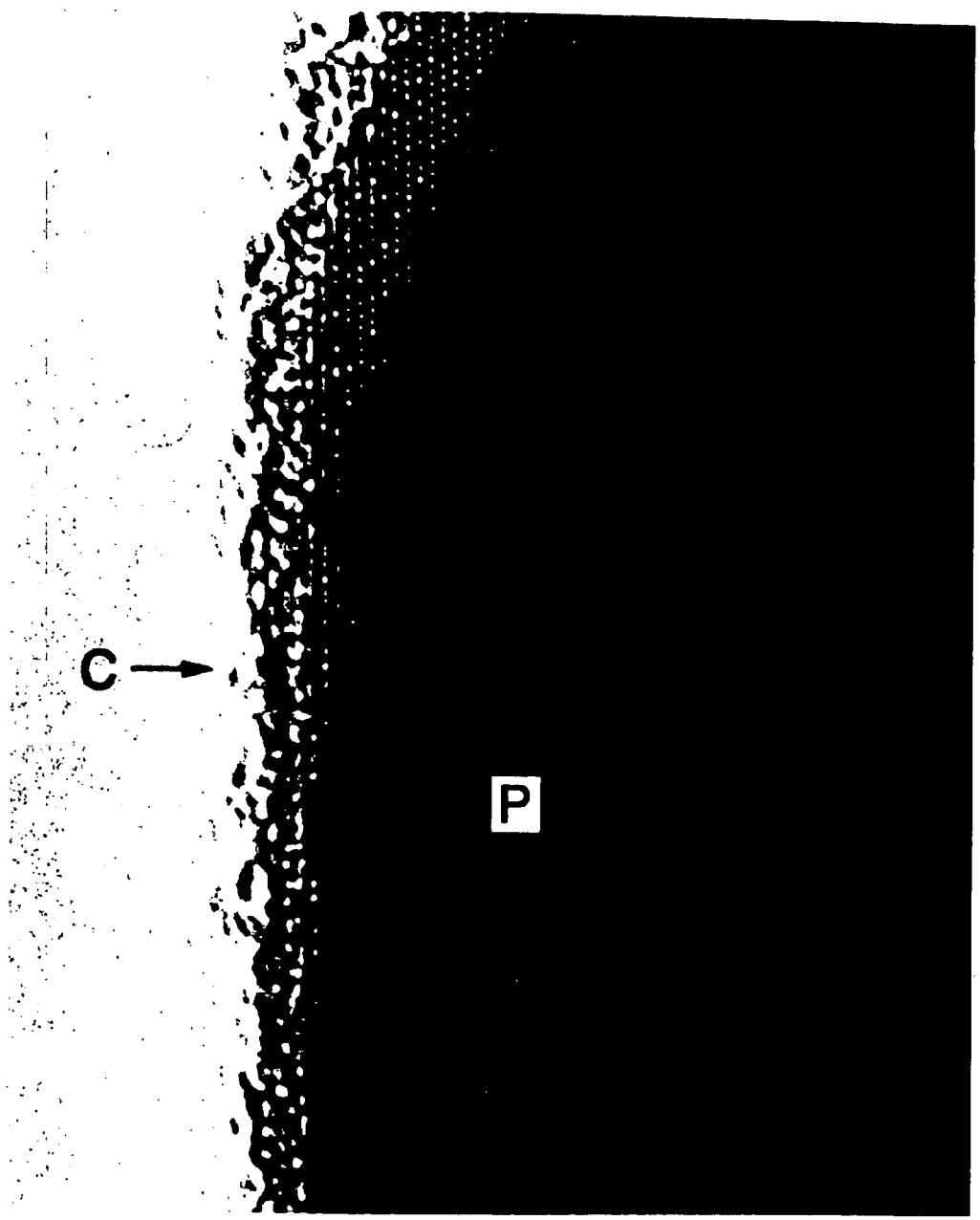

FIGS. 1a and 1b show the pigment particles of the present invention. FIG. 1a is a micrograph of these particles. FIG. 1b shows a HREM atomic resolution micrograph of the pigment of the present invention.

Figure 2:

FIG. 2 shows a micrograph of a typical wet treated durable grade titanium dioxide commercial pigment.

DETAILED DESCRIPTION OF THE INVENTION

The present invention provides a process for making durable titanium dioxide pigment by vapor phase deposition of surface treatments on the titanium dioxide particle surface, the process comprising the steps of:

(a) reacting titanium tetrachloride vapor and aluminum chloride and at least a stoichiometric amount of oxygen in a plug flow reactor to form a product stream containing titanium dioxide particles; and (b) introducing silicon tetrachloride into the reactor at one or more points downstream of the point where the titanium tetrachloride and oxygen were contacted and where at least 97% of the titanium tetrachloride has been converted (3% unreacted titanium tetrachloride) to titanium dioxide.

The term durable as used herein means a pigment suitable for exterior architectural coatings and automotive refinish or color coat/clear coat OEM finishes. Generally such pigments are characterized in that no more than about 25% of the pigment dissolves in sulfuric acid in the acid solubility test as described below, and that silicon dioxide represents at least 1.4 to 2% of the total weight of the pigment.

The composition of the oxide treatment deposited by the process of the present invention is a mixture of amorphous aluminum oxide and amorphous silicon dioxide. The thickness of the treatment layer deposited in the present invention is not more than about 4 nm. The pigment is more than 99% rutile.

The uniformity of the surface treatment according to the present invention may be seen in FIGS. 1a and 1b. FIG. 1a shows a photomicrograph of pigment particles of the present invention. The treatment on the surface of these particles can be seen to be complete and uniform. It is believed that the uniformity and the completeness of the surface treatment layer in the present pigments results in acid solubilities of less that 25% even at silica concentrations of about 1% by weight of the total pigment.

FIG. 1b shows an atomic resolution HREM of a typical particle product of the present invention. In this Figure the region "P" indicates the titanium dioxide particle, and the layer "C" is the treatment layer of amorphous oxides of aluminum and silicon. The uniformity and full extent of coverage of the layer is readily visible.

Analysis of samplings of 1000 particles as described below was used to determine the fraction of particles treated having frill, complete surface coverage. When at least 85% of the particles had full, complete surface coverage (FIGS. 1a, 1b), the acid solubility of these particles was equal to that of durable, commercial grade products. Experience has shown that acid solubility of 25% or less correlates with outdoor exposure required for commercial grade durable pigments. Thus, acid solubility serves as an accelerated durability test.

Full, complete coverage of the particles means that the entire surface of the titanium dioxide particle is covered with the layer of surface treatment. The product of the present invention is characterized by the fact that at least 85% of the particles are fully and completely covered by a layer of surface treatment. This layer is thin and uniform. The thickness of the layer is about 1 to 4 nm for particles that are about 1% by weight aluminum oxide and 1.2% by weight silicon dioxide. Higher concentrations of the surface treatment are expected to produce thicker layers, but at equal uniformity. Microscopic analysis of the product of the Example has shown that about 80% or more of the pigment particles of the present invention have a treatment layer thickness of 1 to 2.5 nm, while in less than about 5% of the pigment particles, the treatment layer is about 4 nm thick.

The inventors believe that it is the completeness of surface coverage resulting from the process of the present invention that may provide pigment durability meeting industry standards at treatment levels of about 2 to 3% of the total pigment weight compared to treatment levels of about 6% required for typical architectural durable grade titanium dioxide pigment. In each of the treatment levels noted immediately above, the weight percent shown is the combined concentrations of aluminum oxide and silicon dioxide.

In comparison to the present invention, wet treatment processes deposit silicon dioxide and aluminum oxide on to the surface of the pigment particle by precipitation. Wet treatment processes typically produce silica debris, crystalline aluminum oxide, and irregular particle surfaces such as shown in FIG. 2. Crystalline oxides typical of wet treatments are not found in the product of the present invention.

Elimination of wet treatment offers an advantage in the overall titanium dioxide manufacturing process in reducing processing steps. New treatment compositions offer the potential to produce pigments having improved processing characteristics and properties.

In contrast to pigments produced by wet treatment processes, the pigment of the present invention is free of debris. This lack of debris may contribute to improved dispersion and improved performance in coatings and plastics. The presence of debris may be seen in FIG. 2.

Although pigment durability can be achieved at levels of silicon dioxide of about 1% by weight of the pigment, higher levels of silicon dioxide and of aluminum oxide may be deposited on the surface of a pigment of the present process. Also other oxides may be deposited using the present process, and the pigment of the present invention may be treated with organic treatments as is known by one skilled in this art. Although a durable pigment is produced by the process of the present invention when at least 85% of the particles have a full, complete surface coverage, it is preferred that at least 95% of particles having full, complete surface coverage, and a fraction of about 98% or more is even more preferred.

In the present process, titanium tetrachloride is preheated to a temperature of from about 300 to 650° C. and mixed with aluminum trichloride forming a chloride mix which is fed into a pre-heated stream of oxygen. This chloride mix may contain other metal compounds, except silicon tetrachloride, used in the chloride pigment manufacture including compounds of boron, phosphorous, zirconium, and others. The introduction of phosphorous compounds into the oxidizer is generally positioned to control corrosion and may be at some point down stream of the point where titanium tetrachloride and aluminum trichloride are introduced into the reactor.

According to the present invention, it is essential that the aluminum trichloride be added in advance of and in a location far removed from the point where silicon tetrachloride is introduced into the reactor. Thus, the preferred location for the addition of the aluminum trichloride is in a mixture with the titanium tetrachloride.

In the process of the present invention, oxygen is present as an initial reactant and may also be added with the addition of the silicon tetrachloride. Although it is preferred to run the present process with the oxygen in excess of the amount required to oxidize the chloride mix, the process may be operated with the concentration equal to or less than the stoichiometric amount.

The addition of silicon tetrachloride according to the present invention is made when the conversion of titanium tetrachloride to titanium dioxide is nearly complete. For example, at least 97% of the titanium tetrachloride has been converted to titanium dioxide. That is, the point where not more than 3% of the titanium tetrachloride remains unreacted. From their work the inventors have found that the point in the reactor where about 3% of the titanium tetrachloride is unreacted, the fraction of particles having full, complete coverage by the surface treatment is about 85%. At the point in the reactor where about 2% of the titanium tetrachloride is unreacted, the fraction of particles having full, complete coverage by the surface treatment is about 95%. At the point in the reactor where about 1% of the titanium tetrachloride is unreacted, the fraction of particles having full, complete coverage by the surface treatment is more than about 98%. The corresponding amount of titanium tetrachloride converted to titanium dioxide at these points is at least 97%, at least 98% and at least 99%, respectively.

When the present process is run as preferred, with at least the stoichiometric amount of oxygen, the addition points for silicon tetrachloride may be calculated by the following equations:

$$K = \frac{[2(100\% - u_{TiCl4}) + \phi \times 100\%]^2}{u_{TiCl4}(\beta + u_{TiCl4})}$$

and $$T < \frac{20733}{\ln K + 6.391} - 273.15$$

where
$u_{TiCl4}$=unreacted TiCl4 (%)
$\beta$=excess O2 (%)
$\phi$=feed Cl2 mole ratio (mol/mol TiCl4), and
T=temperature (C)

K is the equilibrium constant for the reaction of the present process:

$TiCl_4 + O_2 \rightarrow TiO_2 + 2Cl_2$;

Using this equation, one may calculate the point where the silicon tetrachloride is first introduced from the feeds going into the reactor. Excess oxygen, $\beta$, is the oxygen in excess of that required to convert the mixture of titanium tetrachloride and aluminum trichloride fed into the reactor to their respective oxides (the stoichiometric amount). The feed chlorine mole ratio, $\phi$, is the ratio of the moles of chlorine fed divided by the moles of titanium tetrachloride fed to the reactor over a fixed period of time, for example, per hour. The percent unreacted titanium tetrachloride, $u_{TiCl4}$, is not more than 3% as is required by the present invention. Using the calculated equilibrium constant, K, one can then solve for the temperature at the point where silicon tetrachloride is first introduced according to the present invention. The point in the reactor where this introduction is made according to the present invention may be determined using the temperature profile of the particular reactor.

This calculation is independent of reactor size and pressure and requires only knowledge of the feed composition (oxygen, chlorine and titanium tetrachloride in moles per hour) and the temperature profile for the reactor. Temperature profiles for a given reactor may be determined from well-known thermodynamic and heat transfer principles.

This method of calculating the addition points provide some flexibility, based on the feed mix that may be of importance in designing product features to serve a particular pigment end use application.

The present process for making durable titanium dioxide pigment by vapor phase deposition of surface treatments on the titanium dioxide pigment particle surface may also be operated with a mixture of titanium tetrachloride and aluminum trichloride where the oxygen may be present in an amount less than the stoichiometric amount. In this case the process comprising the steps of:

(a) reacting titanium tetrachloride vapor, an oxygen containing gas and aluminum chloride in a plug flow reactor to form a product stream containing titanium dioxide particles; and (b) introducing silicon tetrachloride into the reactor at one or more points downstream of the point where the titanium tetrachloride and oxygen were contacted and where the reaction temperature is no greater than about 1200° C.

In this case one would use the reactor temperature profile to locate a point where the reaction temperature is no greater than about 1200° C., and preferably no greater than 1100° C. The addition of silicon tetrachloride would be made at this point or a point down stream of this calculated location. The use of the temperature profile and the requirement that the addition of silicon tetrachloride be made at a location where the reaction temperature is less than about 1200° C. is useful in cases where oxygen is present in excess, just equal to or less than the stoichiometric amount needed to oxidize the chloride mix.

Test Methods

Acid Solubility is determined as the amount of pigment that dissolves in hot concentrated sulfuric acid.

A small sample of pigment was placed in hot sulfuric acid (about 175° C.) and digested for an hour. The sample was then diluted with a measured amount of water and all particulate material was filtered out. A measured sample of the filtrate was then placed in a volumetric flask. Hydrogen peroxide was added to the flask to ensure all the titanium ions were in the proper oxidation state for their concentration to be determined spectrophotometrically at 400 nm. The flask was then filled to volume with 10% sulfuric acid. The absorbance was measured vs. a blank containing the same amount of hydrogen peroxide as was added to the sample in 10% sulfuric acid. The percent of titanium dioxide was read from a calibration curve prepared from known standards.

High Resolution Electron Microscopy Procedures:

A combination of high resolution transmission EM (HREM) with atomic resolution and high resolution low voltage scanning EM (LVSEM) was used to determine the microstructure, morphology, treatment layer thickness, uniformity and chemical composition.

Microstructure and high precision chemical compositional analyses on a (sub)nanometer scale were carried out by HREM and the associated electron stimulated energy dispersive X-ray compositional spectroscopy (EDX), respectively. A Philips CM200 field emission gun HREM/STEM, Philips CM20 HREM and a modified Philips CM30 environmental-HREM instruments were used in the investigations, with an accelerating voltage of 200 kV (ref: P. L. Gai, DuPont: published in Advanced Materials, Vol. 10, p. 1259, 1998). All the EMs were equipped with X-ray spectrometers to analyze chemical composition.

The extent of treatment and treatment layer coverage observations were made on all sides (including top and bottom surfaces) of the particles using standard sample tilting methods. For HREM, the pigment crystals were oriented so that the desired crystal axes (e.g.<010>) were exactly parallel to the electron beam. Primary magnifications were 100,000 to 750,000.

A minimum sampling of 1000 particles having variable particle size and dimensionality was studied to represent an accurate measure of the fraction particles treated and the extent of the treatment surface coverage. HREM at atomic resolution was used to determine monolayer coatings as well as nanometers-scale coatings. Observations of irregularity in treatment layers of partially coated and fully coated particles were carried out. Histograms were prepared according to standard statistical methods were used to determine the fraction of particles where the treatment layer was full and complete at treatment layer thickness.

EXAMPLE

Titanium tetrachloride was pre-mixed with aluminum trichloride (chloride mix) and fed to the oxidation reactor. The amount of aluminum trichloride in the mixture was sufficient to provide about 1 wt % aluminum oxide based on total solids formed in the oxidation reactor.

The chloride mix was evaporated and pre-heated to about 450° C. and introduced into the reaction zone.

Simultaneous with the introduction of the chloride mix, pre-heated oxygen (where the total excess oxygen was about 14 mole %) was continually introduced through a separate inlet adjacent to the chloride mix inlet. Trace amounts of KCl dissolved in water was added to the oxygen stream as disclosed in British Patent 922,671 and U.S. Pat. No. 3,202,866. The $Cl_2/TiCl_4$ mole ratio in the feed was 1:1.

Reaction temperature where the chloride mix contacted the oxygen was about 1550° C. Silicon tetrachloride was added as a dispersed liquid down stream from where the chlorides mix and the oxygen streams were initially contacted at the point where approximately 1% of the titanium tetrachloride remained unconverted. That is, more than 99% of the titanium tetrachloride had been converted to titanium dioxide. The silicon tetrachloride was added in an amount sufficient to yield a pigment having 1.2% of its total weight as silicon dioxide. The temperature at this point of addition was estimated to be approximately 1100° C.

In the prior art, addition of the silicon tetrachloride at such a low temperature was considered impossible because of the concern that silicon tetrachloride would not have sufficient temperature to be converted completely to the oxide. Although known reaction models predicted incomplete reaction of the silicon tetrachloride and oxygen at the 1100° C.-reaction temperature, there was no unreacted silicon tetrachloride in the product exiting the reactor.

The product pigment produced had the following properties. The fraction of the particles that were covered by the treatment layer was 97%. The treatment layer was uniformly deposited as is shown in FIGS. 1a and 1b. The acid solubility of this pigment was about 21%. Acid solubility of a typical wet treated durable grade is about 25%.

A second feature of the pigment produced was the low moisture content as measured using standard TGA methods. Losses of weight at 300° C. for the present product was about 0.6% and at 600° C. about 0.9% compared to commercial product weight losses of 0.9% and 1.6%, respectively. Such low moisture content may be preferred for a pigment in plastic extrusion films.

The product pigment composition was 1.2% silicon dioxide and 1% aluminum oxide.

COMPARATIVE EXAMPLE

A control test was made according to U.S. Pat. No. 5,562,764 to Gonzalez. The reaction conditions were the same as in the test above, except the addition of silicon tetrachloride was made at a point near 5 feet downstream from the point where the oxygen and chlorides mix streams were initially contacted and at a temperature of 1400 to 1500° C. At this point more than 5% of the titanium tetrachloride was unreacted. The fraction of the particles that were covered by a treatment layer was only 16%. That is, about 84% of the pigment particles had surfaces that were not covered. The acid solubility of this pigment was about 35%.

In Gonzalez the addition of silicon tetrachloride was made to influence the crystal form and pigment carbon black undertone of the pigment produced. The addition of silicon tetrachloride in the present invention is made at a temperature less than 1200° C. and preferred to be no greater than about 1100° C. At such temperatures the particles are essentially formed, and the silicon tetrachloride addition does not influence either crystal phase or pigment carbon black undertone.

The invention claimed is:

1. A process for making durable rutile titanium dioxide pigment by vapor phase deposition of surface treatments on the titanium dioxide pigment particle surface, the process comprising the steps of:
   (a) reacting titanium tetrachloride vapor and aluminum chloride and at least a stoichiometric amount of oxygen in a plug flow reactor to form a product stream containing more than 99% rutile titanium dioxide particles;
   (b) introducing silicon tetrachloride into the reactor at one or more points downstream of the point where the titanium tetrachloride, aluminum chloride, and oxygen were contacted and where at least 97% of the titanium tetrachloride has been converted to titanium dioxide to form the durable rutile titanium dioxide pigment wherein at least 85% of the titanium dioxide pigment particles are completely covered by a uniform layer formed from a mixture of amorphous aluminum oxide and amorphous silicon dioxide; and
   (c) withdrawing from the reactor the durable rutile titanium dioxide pigment, whereby the silicon tetrachloride introduced in (b) does not influence crystal phase or pigment carbon black undertone.

2. The process of claim 1 wherein silicon tetrachloride is introduced into the reactor when at least 98% of the titanium tetrachloride has been converted to titanium dioxide to form the durable rutile titanium dioxide pigment wherein about 95% of the titanium dioxide particles are completely covered by a uniform layer formed from a mixture of amorphous aluminum oxide and silicon dioxide.

3. The process of claim 1 wherein silicon tetrachloride is introduced into the reactor when at least 99% of the titanium tetrachloride has been converted to titanium dioxide to form the durable rutile titanium dioxide pigment wherein more than about 98% of the titanium dioxide particles are completely covered by a uniform layer formed from a mixture of amorphous aluminum oxide and silicon dioxide.

4. The process of claim 1 wherein the silicon tetrachloride is introduced in an amount sufficient to provide a silicon dioxide content of about at least 1.2% by weight and the aluminum trichloride is added in an amount sufficient to provide an aluminum oxide content of at least about 1% by weight.

5. The process of claim 1 wherein steam or oxygen is introduced at a point downstream of the point of introduction of silicon tetrachloride or wherein steam or oxygen are introduced along with the silicon tetrachloride.

6. The process of claim 1 wherein the durable rutile titanium dioxide pigment withdrawn from the reactor is free of debris.

7. The process of claim 1 wherein about 80% or more of the durable rutile titanium dioxide pigment withdrawn from the reactor has a treatment layer thickness of 1 to 2.5 nm, while in less than about 5% of the pigment withdrawn from the reactor, the treatment layer is about 4 nm thick.

8. The process of claim 1 wherein no more than about 25% of the durable rutile titanium dioxide pigment withdrawn from the reactor dissolves in sulfuric acid.

9. The process of claim 1 wherein the silicon tetrachloride is introduced into the reactor where the temperature is no greater than about 1200° C.

10. The process of claim 1 wherein the silicon tetrachloride is introduced into the reactor where the temperature is no greater than about 1100° C.

11. A durable rutile titanium dioxide pigment, the pigment produced by:
   (a) reacting titanium tetrachloride vapor and aluminum chloride and at least a stoichiometric amount of oxygen in a plug flow reactor to form a product stream containing more than 99% rutile titanium dioxide particles; and
   (b) introducing silicon tetrachloride into the reactor at one or more points downstream of the point where the titanium tetrachloride, aluminum chloride and oxygen were contacted and where at least 97% of the titanium tetrachloride has been converted to titanium dioxide to form the durable rutile titanium dioxide pigment wherein at least 85% of the pigment particles are completely covered by a uniform layer formed from a mixture of amorphous aluminum oxide and amorphous silicon dioxide; and
   (c) withdrawing from the reactor the durable rutile titanium dioxide pigment whereby the silicon tetrachloride introduced in (b) does not influence crystal phase or carbon black undertone.

12. The pigment of claim 11 wherein silicon tetrachloride is introduced into the reactor when at least 98% of the titanium tetrachloride has been converted to titanium dioxide to form the durable rutile titanium dioxide pigment wherein about 95% of the titanium dioxide particles are completely covered by a uniform layer formed from a mixture of amorphous aluminum oxide and silicon dioxide.

13. The pigment of claim 11 wherein silicon tetrachloride is introduced into the reactor when at least 99% of the titanium tetrachloride has been converted to titanium dioxide to form the durable rutile titanium dioxide pigment wherein more than about 98% of the titanium dioxide particles are completely covered by a uniform layer formed from a mixture of amorphous aluminum oxide and silicon dioxide.

14. The pigment of claim 11 wherein the percent of silicon dioxide is at least about 1.2% of the total weight of the pigment and the aluminum oxide is at least about 1% of the total weight of the pigment.

15. The pigment of claim 11 wherein the durable rutile titanium dioxide pigment withdrawn from the reactor is free of debris.

16. The pigment of claim 11 wherein no more than 25% of the durable rutile titanium dioxide pigment withdrawn from the reactor dissolves in sulfuric acid.

17. Durable rutile titanium dioxide pigment particles having a surface treatment layer comprising aluminum oxide and silicon dioxide wherein at least 85% of the pigment particles are completely covered by a uniform layer formed from a mixture of amorphous aluminum oxide and amorphous silicon dioxide, the pigment particles being free of debris and no more than about 25% of the durable rutile titanium dioxide pigment particles dissolve in sulfuric acid.

18. The titanium dioxide pigment of claim 17 wherein about 95% or more of the pigment particles are completely covered by a uniform layer formed from a mixture of amorphous aluminum oxide and amorphous silicon dioxide.

19. The titanium dioxide pigment of claim 17 wherein more than about 98% of the pigment particles are completely covered by a uniform layer formed from a mixture of amorphous aluminum oxide and amorphous silicon dioxide.

20. The titanium dioxide pigment of claim 17 wherein about 80% or more of the pigment particles have a treatment layer thickness of 1 to 2.5 nm, while in less than about 5% of the pigment particles, the treatment layer is about 4 nm thick.

21. The titanium dioxide of claim 17 having a silicon dioxide content of about at least 1.2% by weight and an aluminum oxide content of at least about 1% by weight.

22. A durable rutile titanium dioxide pigment wherein at least 85% of the titanium dioxide particles are completely covered by a uniform layer formed from a mixture of amorphous aluminum oxide and amorphous silicon dioxide, the pigment produced by
   (a) reacting titanium tetrachloride vapor and aluminum chloride and at least a stoichiometric amount of oxygen in a plug flow reactor to form a product stream containing more than 99% rutile titanium dioxide particles;
   (b) determining the temperature in the reactor where not more than 3% of the titanium tetrachloride remains unreacted using $$K = \frac{[2(100\% - u_{TiCl4}) + \phi \times 100\%]^2}{u_{TiCl4}(\beta + u_{TiCl4})}$$

and $$T < \frac{20733}{\ln K + 6.391} - 273.15$$

where
$u_{TiCl4}$=unreacted TiCl4 (%)
$\beta$=O2 (%) in excess of the stiochiometric amount
$\phi$=feed Cl2 mole ratio (mol/mol TiCl4), and
T=temperature (C);
   (c) introducing the silicon tetrachloride into the reactor where the temperature is equal to or less than the temperature calculated in step (b) to form durable rutile titanium dioxide pigment having a uniform layer of a mixture of amorphous aluminum oxide and silicon dioxide; and
   (d) withdrawing from the reactor the durable rutile titanium dioxide, whereby the silicon tetrachloride introduced in (c) does not influence either crystal phase or carbon black undertone.

23. The pigment of claim 22 wherein about 95% of the titanium dioxide particles are completely covered by a uniform layer formed from a mixture of amorphous aluminum oxide and silicon dioxide and the temperature of the reactor where about 2% of the titanium tetrachloride remains unreacted is determined.

24. The pigment of claim 22 wherein more than about 98% of the titanium dioxide particles are completely covered by a uniform layer formed from a mixture of amorphous aluminum oxide and silicon dioxide and the temperature of the reactor where about 1% of the titanium tetrachloride remains unreacted is determined.

25. The pigment of claim 22 wherein the temperature determined in step (b) is no greater than about 1200° C.

26. The pigment of claim 22 wherein the temperature determined in step (b) is no greater than about 1100° C.

27. The pigment of claim 22 wherein the percent of silicon dioxide is at least about 1.2% of the total weight of the pigment and the aluminum oxide is at least about 1% of the total weight of the pigment.

28. The pigment of claim 22 wherein the rutile titanium dioxide pigment withdrawn from the reactor is free of debris.

29. The pigment of claim 22 wherein about 80% or more of the durable rutile titanium dioxide pigment withdrawn from the reactor has a treatment layer thickness of 1 to 2.5 nm, while in less than about 5% of the pigment particles, the treatment layer is about 4 nm thick.

30. The pigment of claim 22 wherein no more than about 25% of the durable rutile titanium dioxide pigment withdrawn from the reactor dissolves in sulfuric acid.

* * * * *